United States Patent
Grossman

(10) Patent No.: US 6,444,912 B1
(45) Date of Patent: Sep. 3, 2002

(54) FLAT CONDUIT WIRE HARNESS ASSEMBLY FOR VEHICLE

(75) Inventor: Vitaly Grossman, West Bloomfield, MI (US)

(73) Assignee: General Motors Corporation, Detroit, MI (US)

( * ) Notice: Subject to any disclaimer, the term of this patent is extended or adjusted under 35 U.S.C. 154(b) by 36 days.

(21) Appl. No.: 09/672,319

(22) Filed: Sep. 28, 2000

(51) Int. Cl.7 ................................................ H01B 7/24
(52) U.S. Cl. ..................... 174/72 A; 174/68.3; 174/135; 174/99 R; 174/69
(58) Field of Search .......................... 174/72 A, 135, 174/99 R, 69, 68.3; 361/826

(56) References Cited

U.S. PATENT DOCUMENTS

| | | | |
|---|---|---|---|
| 3,156,765 A | * 11/1964 | Weiss | 174/101 |
| 3,403,220 A | * 9/1968 | Riedel et al. | 174/101 |
| 5,352,855 A | * 10/1994 | Potter | 174/135 |
| 5,401,905 A | * 3/1995 | Lesser et al. | 174/99 R |
| 5,534,665 A | * 7/1996 | Long | 174/72 A |
| 5,819,374 A | * 10/1998 | Chiles et al. | 24/16 PB |
| 5,911,450 A | * 6/1999 | Shibata et al. | 29/407.04 |
| 5,962,814 A | * 10/1999 | Skipworth et al. | 174/135 |
| 6,229,091 B1 | * 5/2001 | Ogawa et al. | 174/72 A |

* cited by examiner

Primary Examiner—Dean A. Reichard
Assistant Examiner—Jinhee J Lee
(74) Attorney, Agent, or Firm—Laura C. Hargitt

(57) ABSTRACT

A flat conduit wire harness assembly is provided for a vehicle. The flat conduit wire harness assembly includes a plurality of wires extending longitudinally and a conduit disposed about the wires. The flat conduit wire harness assembly also includes a wire tie disposed longitudinally about the conduit to form a bundle of the wires with a generally rectangular cross-sectional shape.

18 Claims, 1 Drawing Sheet

FLAT CONDUIT WIRE HARNESS ASSEMBLY FOR VEHICLE

TECHNICAL FIELD

The present invention relates generally to wire harnesses for vehicles and, more particularly, to a flat conduit wire harness assembly for a vehicle.

BACKGROUND OF THE INVENTION

It is known to provide a wire harness for a vehicle such as a sport utility vehicle or a pick-up truck. Typically, the wire harness is a plurality of wires that are bundled together and pass through portions of a body of the vehicle to connect electrical components together. Typically, the wiring content or number of wires is limited by the space designated for the wire harness. When the wires are bundled together, the wire harness often has a thick and round or elliptical cross-sectional shape. However, the space often available for the wire harness to pass through is thin and flat. Therefore, the wire harness would not pass through these spaces because of its elliptical or round cross-sectional shape.

As a result, it is desirable to provide a flat conduit wire harness for a vehicle. It is also desirable to provide a wire harness with a flat or rectangular cross-sectional shape. It is further desirable to provide a flat conduit wire harness that does not require changes in a body of the vehicle to allow the wire harness to pass therethrough. Therefore, there is a need in the art to provide a flat conduit wire harness assembly for a vehicle.

SUMMARY OF THE INVENTION

It is, therefore, one object of the present invention to provide a new wire harness assembly for a vehicle.

It is another object of the present invention to provide a wire harness for a vehicle that has a flat or rectangular cross-sectional shape.

To achieve the foregoing objects, the present invention is a flat conduit wire harness assembly for a vehicle. The flat conduit wire harness assembly includes a plurality of wires extending longitudinally and a conduit disposed about the wires. The flat conduit wire harness assembly also includes a wire tie disposed longitudinally about the conduit to form a bundle of the wires with a generally rectangular cross-sectional shape.

One advantage of the present invention is that a flat conduit wire harness assembly is provided for a vehicle. Another advantage of the present invention is that the flat conduit wire harness assembly is that the wire harness has a flat cross-sectional shape, regardless of internal forces created by the number of wires therein. Yet another advantage of the present invention is that the flat conduit wire harness assembly changes the sectional properties of the bundle of wires from round-like to flat without manufacturing new parts or changing wiring content. Still another advantage of the present invention is that the flat conduit wire harness assembly simplifies vehicle assembly with one hundred percent secure harness layout and usage reliability. A further advantage of the present invention is that the flat conduit wire harness assembly allows the wire harness to pass through tight spaces that would not be possible without changing the body of the vehicle or the content of the wiring.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
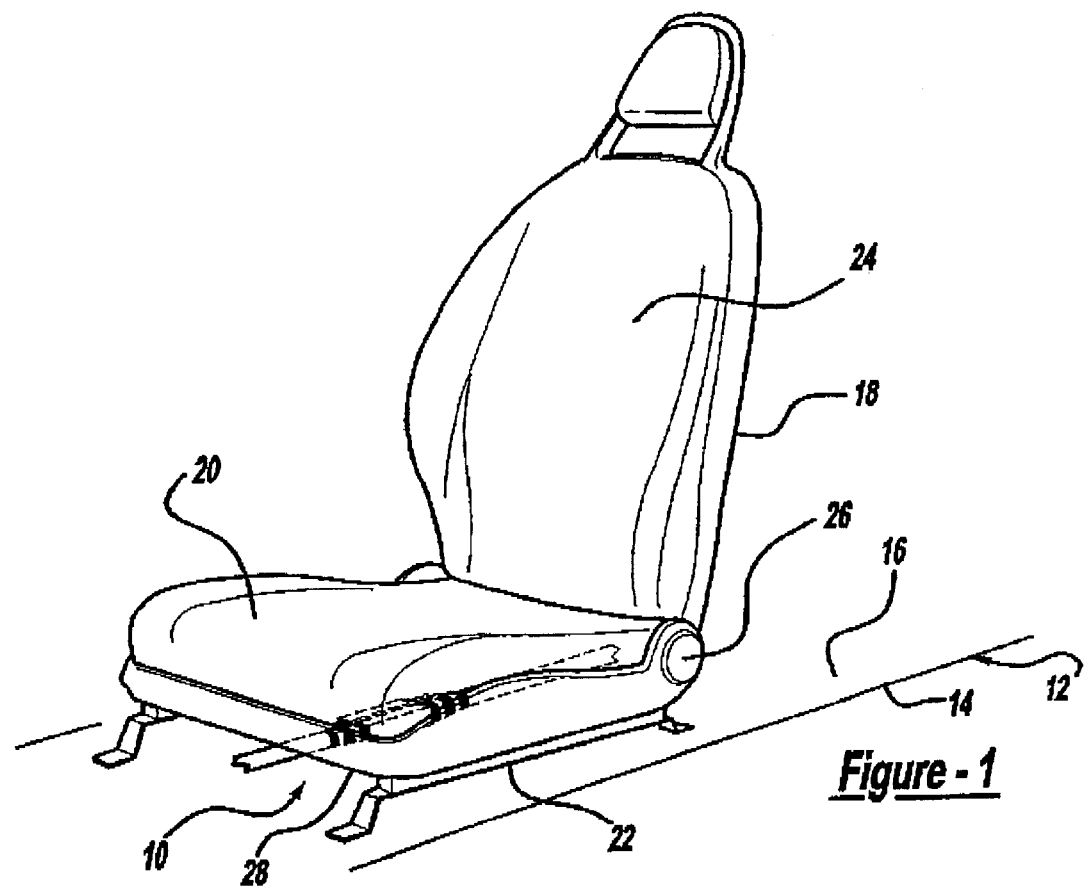
FIG. 1 is a perspective view of a flat conduit wire harness assembly, according to the present invention, illustrated in operational relationship with a seat of a vehicle.
Figure 3:
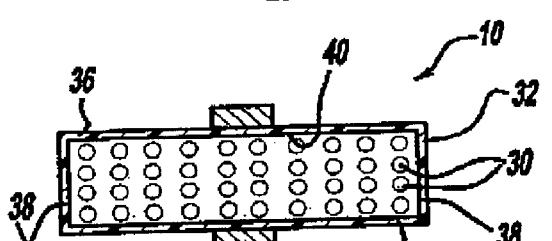
FIG. 3 is a sectional view of the flat conduit wire harness assembly of FIG. 2 taken along section 3—3.
Figure 2:
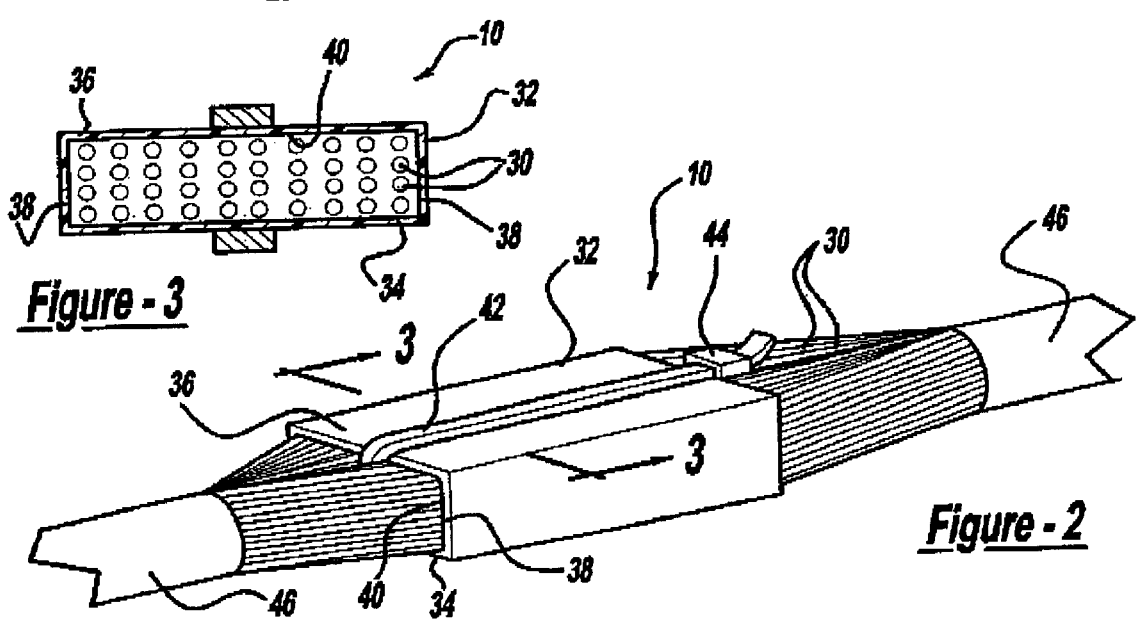
FIG. 2 is a perspective view of the flat conduit wire harness assembly of FIG. 1.

Referring to the drawings and in particular FIGS. 1 through 3, one embodiment of a flat conduit wire harness assembly 10, according to the present invention, is shown for a vehicle, generally indicated at 12. The vehicle 12 includes a vehicle body 14 having a floor 16 and a seat 18 mounted to the floor 16. The seat 18 has a seat portion 20 operatively connected to the floor 16 by one or more seat rails or tracks 22. The seat 18 also includes a back portion 24 pivotally connected to the seat portion 20 by suitable means such as a pivot pin 26. It should be appreciated that a space 28 under the seat rail 22 is a tight space having a relatively small vertical height. It should also be appreciated that the flat conduit wire harness assembly 10 may extend through other portions of the vehicle 12. It should be further appreciated that, except for the flat conduit wire harness assembly 10, the vehicle 12 and seat 18 are conventional and known in the art.

Referring to FIGS. 2 and 3, the flat conduit wire harness assembly 10, according to the present invention, is generally rectangular in shape with a generally flat or rectangular cross-sectional shape. The flat conduit wire harness assembly 10 includes a plurality of wires 30 extending longitudinally. The wires 30 are of the electrical type having a generally circular cross-sectional shape. It should be appreciated that the wires 30 are conventional and known in the art.

The flat conduit wire harness assembly 10 also includes a conduit 32 extending longitudinally and disposed about the wires 30 and longitudinally along a portion thereof. The conduit 32 is flexible and made of a plastic material. The conduit 32 has a bottom wall 34, a top wall 36 spaced vertically from the bottom wall 34 and parallel thereto. The conduit 32 also includes side walls 38 extending vertically between the bottom wall 34 and top wall 36 and parallel thereto to form a passage 40 extending therethrough. The passage 40 has a generally rectangular cross-sectional shape. It should be appreciated that the wires 30 extend through the passage 40. It should also be appreciated that an outer surface of the bottom wall 34 and top wall 36 is planar or flat.

The flat conduit wire harness assembly 10 includes a tie-wrap or wire tie 42 disposed longitudinally around the conduit 32 and between the wires 30. The wire tie 42 is flexible and made of a plastic material. The wire tie 42 has a generally cross sectional shape. The wire tie 42 has a locking member 44 at one end through which a portion of the wire tie 42 extends to secure the wire tie 42 in place. The wire tie 42 may have a portion molded to the conduit 32 to be integral, unitary, and one-piece. It should be appreciated that the wire tie 42 is conventional and known in the art.

In operation of the flat conduit wire harness assembly 10, the wires 30 are extended through the passage 40 of the conduit 32. The wire tie 42 is added longitudinally around the middle of the conduit 32 and secured in place by extending a portion of it through the locking member 44. As a result, the outer surface of the bottom wall 34 and top wall 36 are generally planar and flat to provide the flat conduit wire harness assembly 10 with a rectangular cross-sectional shape as illustrated in FIG. 3. The wires 30 are then taped 46 before and after the conduit 32 as illustrated in FIG. 2. The flat wire harness assembly 10 is then extended through the space 28 under the rail 22 of the seat 18 as illustrated in FIG. 1.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A flat conduit wire harness assembly for a vehicle comprising:

a plurality of wires extending longitudinally;

a conduit disposed about said wires; and a wire tie disposed longitudinally about said conduit dividing a bundle of said wires with a generally rectangular cross-sectional shape.

2. A flat conduit wire harness assembly as set forth in claim 1 wherein said conduit has a passageway extending longitudinally therethrough.

3. A flat conduit wire harness assembly as set forth in claim 2 wherein said passageway is generally rectangular in shape.

4. A flat conduit wire harness assembly as set forth in claim 1 wherein said conduit comprises a bottom wall, a top wall spaced vertically from and parallel to said bottom wall, and side walls extending vertically between said bottom wall and said top wall and being parallel to each other.

5. A flat conduit wire harness assembly as set forth in claim 1 wherein said conduit is made of a plastic material.

6. A flat conduit wire harness assembly as set forth in claim 1 wherein said wire tie is located in a middle of said conduit.

7. A flat conduit wire harness assembly as set forth in claim 1 wherein said wire tie has a locking member at one end for receiving a portion of said wire tie to secure said wire tie in place on said conduit.

8. A flat conduit wire harness assembly as set forth in claim 1 wherein said wire tie and said conduit are integral, unitary, and one-piece.

9. A flat conduit wire harness assembly as set forth in claim 1 wherein said wire tie is made of a plastic material.

10. A flat conduit wire harness assembly for a vehicle comprising:

a plurality of electrical wires extending longitudinally;

a conduit disposed about said wires, said conduit having a passageway extending longitudinally therethrough through which said wires extend; and a wire tie disposed longitudinally about said conduit and between said wires surrounding an outer surface of said conduit with a bundle of said wires therein, and with a generally rectangular cross-sectional shape.

11. A flat conduit wire harness assembly as set forth in claim 10 wherein said passageway is generally rectangular in shape.

12. A flat conduit wire harness assembly as set forth in claim 10 wherein said conduit comprises a bottom wall, a top wall spaced vertically from and parallel to said bottom wall, and side walls extending vertically between said bottom wall and said top wall and being parallel to each other to form said passageway.

13. A flat conduit wire harness assembly as set forth in claim 10 wherein said wire tie is located in a middle of said conduit.

14. A flat conduit wire harness assembly as set forth in claim 10 wherein said wire tie has a locking member at one end for receiving a portion of said wire tie to secure said wire tie in place on said conduit.

15. A flat conduit wire harness assembly as set forth in claim 10 wherein said wire tie and said conduit are integral, unitary, and one-piece.

16. A flat conduit wire harness assembly as set forth in claim 10 wherein said wire tie is made of a plastic material.

17. A flat conduit wire harness assembly as set forth in claim 10 wherein said conduit is made of a plastic material.

18. A flat conduit wire harness assembly for a vehicle comprising:

a plurality of electrical wires extending longitudinally;

a plastic conduit disposed about said wires, said conduit having a passageway extending longitudinally therethrough through which said wires extend, said conduit comprising a bottom wall, a top wall spaced vertically from and parallel to said bottom wall, and side walls extending vertically between said bottom wall and said top wall and being parallel to each other to form said passageway;

a plastic wire tie disposed longitudinally about a middle of said conduit and between said wires overlying said top wall and said bottom wall with a bundle of said wires therein, and with a generally rectangular cross-sectional shape; and tape disposed about said wires at least either before or after said conduit.

\* \* \* \* \*